No. 815,627. PATENTED MAR. 20, 1906.
S. OLDHAM.
HOSE COUPLING.
APPLICATION FILED JULY 11, 1905.
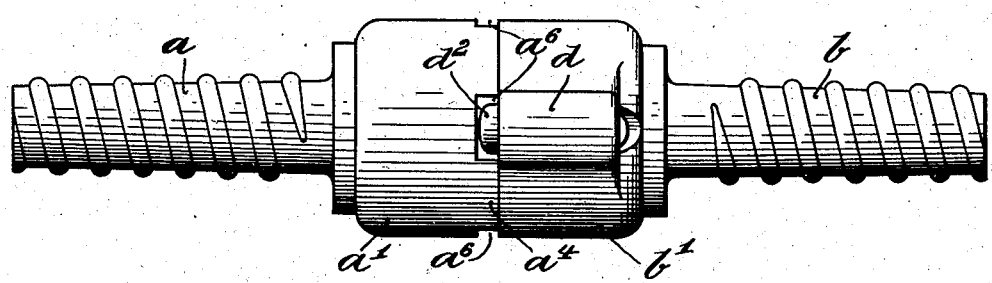
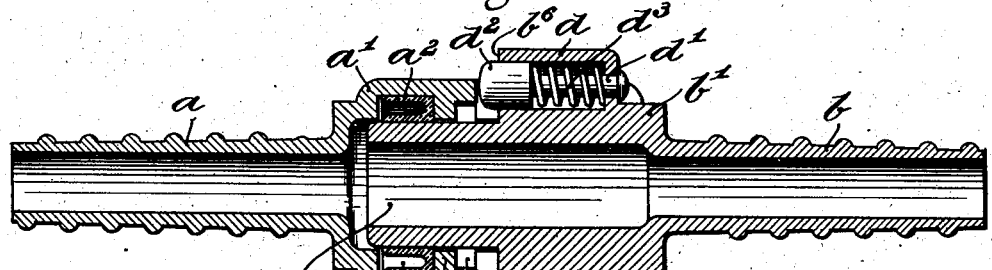
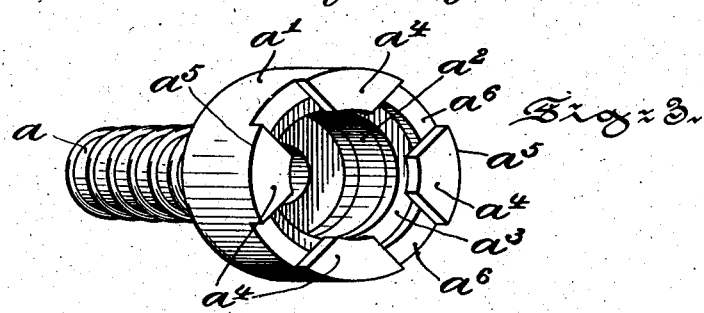
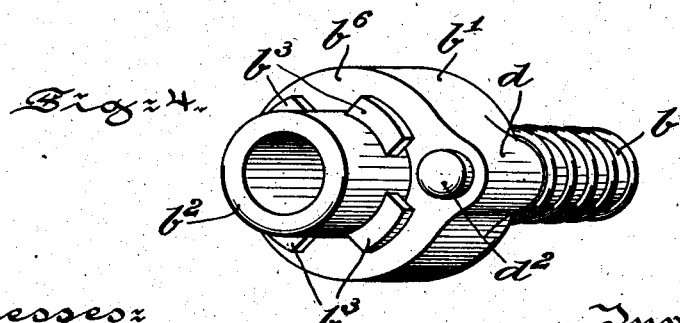
Witnesses:
Jas. C. Wohnsmith
N. N. Gow
Inventor:
Samuel Oldham,
By Henry E. Evrding
Attorney

UNITED STATES PATENT OFFICE.

SAMUEL OLDHAM, OF PHILADELPHIA, PENNSYLVANIA.

HOSE-COUPLING.

No. 815,627.

Specification of Letters Patent.

Patented March 20, 1906.

Application filed July 11, 1905. Serial No. 269,186.

*To all whom it may concern:*

Be it known that I, SAMUEL OLDHAM, a citizen of the United States, residing at Philadelphia, in the county of Philadelphia and State of Pennsylvania, have invented certain new and useful Improvements in Hose-Couplings, of which the following is a specification.

My invention has relation to a coupling for hose or similar pipes, and has especial relation to a coupling for such hose or pipes used in connection with pneumatic, hydraulic, or steam tools.

In hose-pipes used with such tools it is desirable that the coupling, while easily locked, shall remain locked and not be accidentally opened when the pipe is in use. It is also desirable that all the parts of the coupling shall be of simple and inexpensive construction, yet strong, and that the parts shall be adequately protected from injury when they are locked together.

The principal object of my invention is to provide a hose-coupling which shall possess all the advantages and desirable features above enumerated.

The nature and scope of my invention will be understood from the following description, taken in connection with the accompanying drawings, forming part hereof, in which—

Figure 1 is a side elevational view of a hose-coupling embodying main features of my invention. Fig. 2 is a longitudinal sectional view of the same. Fig. 3 is a perspective view of the female member of the coupling, and Fig. 4 is a similar view of the male member.

Referring to the drawings, $a$ and $b$ represent, respectively, the female and male members of the coupling. The female member $a$ has an enlarged head $a'$, within which is held the packing-washer $a^2$, an annular flange $a^3$ being formed within the head to hold said washer $a^2$ in said head. At the rim of the head $a'$ are formed the segmental flanges $a^4$, extending toward the central axis of the head and overlapping the flange $a^3$, which holds the packing $a^2$ in place. Between the segmental flanges $a^4$ the rim $a^5$ of the head is cut to form recesses $a^6$ for a purpose hereinafter explained. The male member $b$ has an enlarged head $b'$, from which projects a tubular extension $b^2$, concentric with the head $b'$ and adapted to enter the female member and to be packed therein by the washer $a^2$, as clearly illustrated in Fig. 2. The tubular extension $b^2$ carries on its periphery a series of segmental wings $b^3$, which are adapted to slide through the spaces separating the segmental flanges $a^4$ of the female member $a$ and to turn upon the annular flange $a^3$ as a seat during the coupling and uncoupling operations. The head $b'$ has a relatively thick wall $b^5$, and from one portion of this wall $b^5$ extends peripherally a box-shaped enlargement $d$, in which is arranged to slide a pin $d'$. This pin $d'$ is provided with a head $d^2$, normally projected beyond the rim $b^6$ of the head $b$ by a coiled or other spring $d^3$, as clearly illustrated in Fig. 2.

The operation of the device is as follows: In assembling the members of the coupling the male member $b$ is inserted in the female member $a$ in such position that the wings $b^3$ enter the spaces between the flanges $a^4$ of the female head $a'$. In this position the uncut or unrecessed portion of the rim $a^5$ of the head $a'$ abuts against the head $d^2$ of the pin $d'$ and serves to depress said pin when the rims $b^6$ and $a^5$ are closed down upon each other. In this position either member of the coupling is turned upon the other until the head $d^2$ of the pin $d'$ comes opposite a recess $a^6$ in the rim $a^5$ of the female member of the coupling and enters said recess $a^6$ to lock the members against further turning. In this position the flanges $a^4$ overlap the wings $b^3$ and prevent the withdrawal longitudinally of one head from the other. When locked, the parts of the coupling which are susceptible to accidental injury are inclosed within the relatively thick walls of both heads $a'$ and $b'$, and both heads $a'$ and $b'$ being rigidly fixed to the members $a$ and $b$ of the coupling there can be no accidental uncoupling of said members. The uncoupling of the heads $a'$ and $b'$ can only be accomplished by the retraction of the head $d^2$ of pin $d'$ from the recess $a^6$ of the head $a'$ and a turning of one head $a'$ or $b'$ upon the other until the wings $b^3$ can be slid through the spaces between the flanges $a^4$ of the head $a'$. Inasmuch as the head $d^2$ of pin $d'$ is not completely inclosed in the recess $a^6$ of the female member, but projects peripherally beyond the recessed rim of said member, the pin $d'$ can be easily retracted by pressing against that portion of its head $d^2$ which is exposed, as shown in Fig. 2.

Having thus described the nature and scope of my invention, what I claim as new, and desire to secure by Letters Patent, is—

In a hose-coupling, a female member provided with alternate recesses and segmental flanges upon its abutting rim, a male member provided with a tubular extension arranged to enter and to turn in said female member, a series of wings formed on the tubular extension and arranged to interlock with said segmental flanges, a box-shaped extension formed upon the periphery of the male member and extending peripherally beyond the recessed rim of the female member, and a headed pin sliding in said box-shaped extension and projecting under spring tension therefrom to enter a recess of the rim of the female member and the head of said pin extending peripherally beyond said rim.

In testimony whereof I affix my signature in the presence of two witnesses.

SAMUEL OLDHAM.

Witnesses:
 HENRY E. EVERDING,
 H. H. GOW